US007951348B2

(12) United States Patent
Shahriari et al.

(10) Patent No.: US 7,951,348 B2
(45) Date of Patent: May 31, 2011

(54) P-TYPE TRANSPARENT CONDUCTING OXIDES AND METHODS FOR PREPARATION

(75) Inventors: Dean Y. Shahriari, Evanston, IL (US); Antoine Barnabé, Toulouse (FR); Thomas O. Mason, Evanston, IL (US); Kenneth R. Poeppelmeier, Evanston, IL (US)

(73) Assignee: Northwestern University, Evanston, IL (US)

( * ) Notice: Subject to any disclaimer, the term of this patent is extended or adjusted under 35 U.S.C. 154(b) by 1008 days.

(21) Appl. No.: 11/316,550

(22) Filed: Dec. 22, 2005

(65) Prior Publication Data

US 2006/0104893 A1 May 18, 2006

Related U.S. Application Data

(62) Division of application No. 10/116,727, filed on Apr. 3, 2002, now Pat. No. 6,979,435.

(60) Provisional application No. 60/281,211, filed on Apr. 3, 2001.

(51) Int. Cl.
*C01G 3/00* (2006.01)
(52) U.S. Cl. .............. 423/263; 423/593.1; 423/600
(58) Field of Classification Search .............. 423/600, 423/593.1, 263
See application file for complete search history.

(56) References Cited

U.S. PATENT DOCUMENTS

| 6,979,435 | B1 | 12/2005 | Shahriari et al. | |
| 2003/0057495 | A1* | 3/2003 | Gong et al. | 257/352 |

FOREIGN PATENT DOCUMENTS

JP 11-278834 * 10/1999

OTHER PUBLICATIONS

Translation of Japan 11-278834, Oct. 1999.*
Gadalla, AMM and White, J; Equilibrium Relationships in the System CuO-Cu2O-Al2O3, J. Brit. Cer. Soc., 1964, 39-62, vol. 63(1).
Jacob, KT and Alcock, CB; Thermodynamics of CuAlO2 and CuAl2O4 and Phase Equilibria in the System Cu2O-CuO-Al2O3, J. Am. Cer. Soc., May-Jun. 1975, 192-195, Vibron West, Hollywood, CA.
Shannon, RD; Rogers, DB; and Prewitt, CT; Chemistry of Noble Metal Oxides. I. Syntheses and Properties of ABO2 Delafossite Compounds, Inorganic Chemistry, 1971, 713-718, vol. 10, No. 4.
Prewitt, C.T; Shannon, RD; and Rogers, DB; Chemistry of Noble Metal Oxides. II. Crystal Structures of PtCoO2, PdCoO2, CuFeO2, and AgFeO2, Inorganic Chemistry, 1971, 719-723, vol. 10, No. 4.
Rogers, D.B.; Shannon, RD; Prewitt; CT; and Gillson, JL; Chemistry of Noble Metal Oxides. III. Electrical Transport Properties and Crystal Chemistry of ABO2 Compounds with the Delafossite Structure, 1971, 723-727, vol. 10, No. 4.
Beverskog, B and Puigdomenech, I; Revised Pourbaix Diagrams for Copper at 25 to 300°C, J. Electrochem. Soc., Oct. 1997, 3476-3483, vol. 144, No. 10, The Electrochemical Society, Inc.
Kawazoe, H; Yasukawa, M; Hyodo, H; Kurita, M; Yanagi, H; and Hosono, H; P-type Electrical Conduction in Transparent Thin Films of CuAlO2, Nature, Letters to Nature, Oct. 30, 1997, 939-942, vol. 389, Macmillan Publishers Ltd.
Kawazoe, H. Yanagi, H; Ueda, K; and Hosono, H; Transparent p-Type Conducting Oxides: Design and Fabrication of p-n Heterojunctions, MRS Bulletin, Aug. 2000, 28-36, www.mrs.org/publications/bulletin.
Yanagi, H; Inoue, S; Ueda, K., Kawazoe, H; Hosono, H; and Hamada, N.; Electronic Structure and Optoelectronic Properties of Transparent p-type Conducting CuAlO2, Journal of Applied Physics, Oct. 1, 2000, 4159-4163, vol. 88, No. 7.
Benko, FA and Koffyberg, FP; Opto-Electronic Properties of CuAlO2, Phys. Chem. Solids, 1984, 57-59, vol. 45, No. 1, Pergamon Press Ltd.
Duan, N; Sleight, A.W; Jayaraj, MK; and Tate, J.; Transparent p-type Conducting CuScO2÷x Films, Applied Physics Letters, Aug. 28, 2000, 1325-1326, vol. 77, No. 9.
Lewis, B and Paine, D; Applications and Processing of Transparent Conducting Oxides, MRS Bulletin, Aug. 2000, 22-27, www.mrs.org/publications/bulletin.
Shahriari, D; Barnabe, A; Mason, T; and Poeppelmeier, K; A High-Yield Hydrothermal Preparation of CuAlO2, Inorg. Chem, 2001, 5734-5735, vol. 40, published on web Oct. 11, 2001.
Freeman, AJ; Poeppelmeier, KR; Mason, TO; Chang, RPH; and Marks, T.J.; Chemical and Thin-Film Strategies for New Transparent Conducting Oxides, MRS Bulletin, Aug. 2000, 45-51, vol. 25, No. 8.

* cited by examiner

*Primary Examiner* — Steven Bos
(74) *Attorney, Agent, or Firm* — Reinhart Boerner Van Deuren s.c.

(57) ABSTRACT

A facile, low temperature and low pressure method for the preparation of a wide range of phase pure $ABO_2$ compositions.

5 Claims, 6 Drawing Sheets

P-TYPE TRANSPARENT CONDUCTING OXIDES AND METHODS FOR PREPARATION

This application is a division of and claims priority benefit from application Ser. No. 10/116,727 filed on Apr. 3, 2002, now U.S. Pat. No. 6,979,435 the entirety of which is incorporated herein by reference, which in turn claims priority benefit from provisional application Ser. No. 60/281,211 filed on Apr. 3, 2001, the entirety of which is also incorporated herein by reference.

This invention was made with government support under grant number DMR-9632472 awarded by the National Science Foundation and grant number AAD-9-18668-05 awarded by the Department of Energy. The government has certain rights in the invention.

BACKGROUND OF THE INVENTION

This invention relates generally to transparent conducting oxides, and more particularly, to such compositions and related structures having p-type conductivities and methods for their preparation under hydrothermal reaction conditions.

Transparent conducting oxides (TCOs) are degenerate wide band-gap semiconductors with conductivities comparable to metals, but are transparent over the visible and IR regions. Currently, the best known and industrially useful TCOs are doped ZnO, $SnO_2$ and $In_2O_3$, all of which are n-type semiconductors. For example, in thin film forms, Sn-doped indium oxide has n-type conductivity on the order of $10^3$ S/cm and an average transmittance higher than 85% in the visible light range. By comparison, in thin film form, the p-type conductivity of $CuAlO_2$ is about 1 S/cm and about $10^{-3}$ S/cm in bulk form. (H. Kawazoe, M. Yasukawa, H. Hyodo, M. Kurita, H. Yanagi and H. Hosono, *Nature*, 389, 939-942 (1997). p-Type Electrical Conduction in Transparent Thin Films of $CuAlO_2$. F. A. Benko and F. P. Koffyberg, *J. Phys. Chem. Solids*, 45, 1, 57-59, (1984). Opto-electronic properties of $CuAlO_2$.)

Many ternary oxides with an $A^I B^{III} O_2$ composition adopt the delafossite ($CuFeO_2$) structure, where A is either Cu, Pd, Pt or Ag and B is a trivalent metal with $0.53 < r(B_{VI}^{3+}) < 1.09$ Å. These delafossite-type oxides comprise a rich family of compounds with interesting luminescence properties and applications in areas of catalysis or electrocatalysis. Until recently, only $SrCu_2O_2$ and nitrogen-doped ZnO were the only known p-type TCOs. The recent discovery of simultaneous p-type conductivity and transparency in $CuAlO_2$ has heightened interest in $CuMO_2$ compounds and in particular those having delafossite structures. Owing to this unique dual property, TCOs find various technological applications in solar cells, optoelectronic materials, energy-efficient windows, gas sensors and flat panel displays, among others. The discovery of new p-type TCOs will open up new application possibilities that are simply not feasible with unipolar n-type materials alone.

To date, most of the bulk $CuAlO_2$ syntheses correspond to direct- or cation exchange reactions in the solid phase. [B. U. Köhler and M. Jansen, *Z. Anorg. Allg. Chem.*, 543, 73-80 (1986). Darstellung and Strukturdaten von Delafossiten $CuMO_2$ (M=Al, Ga, Sc, Y); T. Ishiguro, A. Kitazawa, N. Mizutani and M. Kato, *J. Solid State Chem.*, 40, 170-174 (1981). Single-crystal growth and crystal structure refinement of $CuAlO_2$.>>; H. Hahn and C. Lorent, *Z. Anorg. Allg. Chem.*, 279, 281 (1955); B. Köhler and M. Jansen, *Z. Krist.*, 129, 259 (1983); J. P. Doumerc, A. Amar, A. Wichainchai, M. Pouchard and P. Hagenmuller, *J. Phys. Chem. Solids*, 48, 1, 37-43 (1987). Sur Quelques Nouveaux Composés de Structure de type Delafossite.] Based on the work of Croft et al. on $AgFeO_2$ [W. J. Croft, N. C. Tombs and R. E. England, *Acta Chryst.*, 17, 313 (1964). Crystallographic data for pure Crystalline Silver Ferrite.], Shannon et al. [R. D. Shannon, D. B. Rogers and C. T. Prewitt., *Inorg. Chem.*, 10, 4, 713-727 (1971). Chemistry of Noble Metal Oxides. I. Syntheses and properties of $ABO_2$ Delafossite compounds. II. Crystal structures of $PtCoO_2$, $PdCoO_2$, $CuFeO_2$ and $AgFeO_2$. III. Electrical transport properties and crystal chemistry of $ABO_2$ compounds with the delafossite structure.] reported the first hydrothermal synthesis of $CuAlO_2$ as well as other $ABO_2$ compounds, using a thin-walled platinum tube at 500° C. with 3000 atm of externally applied pressure. However, in addition to the reaction conditions (high temperature and pressure, with prolonged reaction times), a limitation of this technique is that many of the delafossite-type compounds could not be isolated as single phases, without a separate isolation or leaching procedure.

BRIEF DESCRIPTION OF THE DRAWINGS

FIG. 2: Observed (O), calculated (line), and difference (bottom line) X-ray diffraction profiles for 3R—$CuAlO_2$. Calculated positions, those reflections that are marked with vertical bars, and intensities match those of JCPDS #77-2493; refined structural parameters (a=2.8617(2) Å, c=16.9407(8) Å, z(O)=0.1089(2)) match single-crystal data. To confirm phase formation and purity, powder X-ray diffraction (XRD) data for each sample were collected every 0.05° for $10°<2θ<70°$ on a Rigaku diffractometer with Ni-filtered Cu Kα radiation. For phase-pure samples, data were collected every 0.02° for $10°<2θ<110°$. Rietveld refinements were performed using the FULLPROF software program. (Rodriguez-Carvajal, *J. Abstracts of the Satellite Meeting on Powder Diffraction of the XV Congress of the IUCr*; Toulouse, France, 1990; p 127).

FIG. 4: $CuAlO_2$ Scanning Electron Microscopy images, comparing a present composition (4A) and one prepared according to the prior art (4B).

FIG. 6: Power X-ray diffraction patterns for (A) hydrothermal synthesis of $CuAl_{1-n}Ga_nO_2$ solid solution, where n=0 (bottom), n=0.50 (middle), and n=1.0 (top); and (B) 1000° C. solid-state synthesis in air of $CuAlO_2$ (bottom), a two-phase product consisting of a 1:1 mixture of $CuAlO_2$ and $CuGaO_2$ (middle), and $CuGaO_2$ (top).

FIG. 7.

SUMMARY OF THE INVENTION

In light of the foregoing, it is an object of the present invention to provide transparent conducting oxides, compositions and/or methods for their preparation, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide moderate reaction conditions for the facile hydrothermal synthesis of transparent conducting oxides, including but not limited to the systems described herein by example and/or illustrating the present methodology.

It can also be an object of the present invention to provide $ABO_2$ compounds and/or materials with phase purities not otherwise achievable through hydrothermal methods of the prior art.

It can also be an object of the present invention to provide a general methodology whereby a variety of transparent conducting oxides, including but not limited to those having a $CuMO_2$ formula, can be designed and/or tailored through isovalent cationic substitution, such oxides further providing a variety of preconceived optical and/or electrical properties.

It can also be an object of the present invention to provide one or more $ABO_2$ compounds and/or materials, including those having a $CuMO_2$ molecular formula, such compounds and/or materials preferably having a delafossite-type structure with oxygen intercalation.

It can also be an object of the present invention to provide, in accordance with one or more of the preceding objectives, a p-type TCO compound and/or material for use and/or integration into a variety of diodes, transistors, and p-n heterojunctions, as well as for use in conjunction with thin film sputtering targets.

Other objects, features, benefits and advantages of the present invention will be apparent from this summary and its descriptions of various preferred embodiments, and will be readily apparent to those skilled in the art having knowledge of various transparent conducting oxides and related synthetic techniques. Such objects, features, benefits and advantages will be apparent from the above as taken into conjunction with the accompanying examples, data, figures and all reasonable inferences to be drawn therefrom.

In part, the present invention is a hydrothermal method for the preparation of oxides having the formula $ABO_2$. Such a method avoids the extreme reaction conditions of the prior art, using commercially available metals and metal oxides reacting under moderate temperatures and without application of external pressures. As illustrated elsewhere herein, this methodology can be considered in view of the reaction formula and stoichiometries shown in equation (1), below.

(1)

(where $0 \leq x \leq 1$)

In accordance with the methodology and related aspects of this invention, a wide variety of oxide compositions can be prepared hydrothermally. Such a method for preparation can include (1) providing, mixing and/or placement of the desired metallic (B-site) and oxide (A-site and B-site) reagents and/or starting materials, under basic conditions, in a suitable reaction vessel, such a vessel conducive to the introduction of water therein; (2) heating the reaction medium to a first temperature and/or sufficient to initiate reaction of the reagents/starting materials; and (3) maintaining the reaction at a temperature, preferably a second higher temperature, sufficient to prepare the oxide product. Such temperatures are less than and/or substantially less than about 500° C. Likewise, reaction pressures are less than and/or substantially less than about 3000 atmospheres. Generally, the pressure and temperature parameters of the present methodology are within ranges considerably less than those referenced in conjunction with hydrothermal methods of the prior art. Phase pure solid oxide product can be isolated upon incremental cooling of the reaction medium, to room temperature. Other aspects relating to the compositions and/or methods of this invention are as elsewhere described herein. Autoclave/bomb and related equipment considerations will be well known to those skilled in the art and made aware of this invention.

In accordance with the broad methodology of this invention, and with reference to equation (1) above, a range of synthetic transformations can be achieved. With consideration of the stoichiometric relationship of equation (1), the relative amount of each reagent or starting material can vary with the value of x. Likewise, the value of x can be varied between 0 and 1, as would be understood by those skilled in the art made aware of this invention, to determine optimal reaction conditions for each A-B system en route to the desired $ABO_2$ composition. Several examples of this invention, as provided below, illustrate the scope of this invention in the context of copper aluminate syntheses.

Accordingly, the present invention also includes phase pure $ABO_2$ compositions, of the type as can be prepared using the methodology outlined above. In preferred embodiments, A is a monovalent cation and B is a trivalent cation, each of which as provided in the $ABO_2$ material/compound in accordance with and corresponding to the respective cationic or metallic reactants shown in equation (1), above. Other valence and stoichiometric relationships are possible, but the aforementioned mono/trivalent relationship is especially useful by way of providing delafossite-type structures together with the optical and electrical properties resulting therefrom. Regardless, the A-site metal can include Cu, Pd, Pt and Ag. In a broader sense, $d^{10}$ cations are preferred and most likely to provide transparent conductors. B-site metals are preferably Al, Ga, Sc and/or In, and can otherwise be selected from the lanthanide (Ln) series. In particular and without limitation, the present invention contemplates $CuMO_2$ compounds and/or materials having a delafossite-like structure, where M is Al, Ga, In, Sc or Ln (lanthanides). As inferred above, other non-delafossite-type species can be prepared as described herein from the corresponding cations/metals for use in catalytic and electrocatalytic applications.

In part, the present invention includes a more general hydrothermal method for the preparation of novel solid solutions previously unobtainable via other synthetic methods. Such solid solutions, compounds, compositions and/or materials can be prepared, in accordance with this invention via a straight-forward extension of the methodology illustrated by equation (1), as shown in equation (2), below.

(2)

(where $0 \leq m \leq 1$ and $0 \leq n \leq 1$)

As discussed above, various combinations of mono- and trivalent cationic/metal species can be utilized to provide a wide variety of solid solutions, compositions, materials and the like. In particular, the optical (e.g., transparency) and/or electrical (e.g., p-type conductivity) properties of each can be tailored or designed through cationic/metal choice and incorporation of such species into a synthetic sequence in accordance with the chemical and/or stoichiometric relationships described herein. Reference is made to example 11, below, and variations in the relative stoichiometries of Al and Ga to provide a range of such compositions with varying optical and electrical properties.

In part, the present invention can also provide a method for oxygen intercalation and/or of preparing transparent conducting oxides having enhanced total oxygen content, such content enhanced as compared to methods, procedures and/or compositions of the prior art. As described more fully below and as would be understood by those skilled in the art, greater total oxygen content ($O_{2+\delta}$) provides a favorable effect on the resulting electronic properties. Without restriction or limitation, this and other aspects of the present invention can be considered with analogy to one or more principles underlying Vegard's Law, in particular, the relationship of unit cell size and interstitial dimensions. Larger B-site cations afford increased interstitial spacing and potential for oxygen intercalation. Accordingly, the compositions and materials for this invention provide a range for increased oxygen contents ($O_{2+\delta}$), the extent of which as can be determined by choice of A- and/or B-site cations and corresponding unit cell design.

In part, the present invention is also a method of using a B-site metal, corresponding to the present reaction schematic, to facilitate preparation of the $ABO_2$ compounds of this invention. In particular, a neutral B-site metal is utilized as a reducing agent for the corresponding A-site metal cation. Such reduction facilitates dissolution of the corresponding cationic reactant en route to the oxide product. Such a redox relationship is achieved under basic conditions. As applicable to other aspects of the inventive methodology, such conditions are preferentially achieved using sodium hydroxide. Such a reagent is chosen primarily for reasons of economy. However, the requisite basic conditions can also be provided through use of other reagents known to those skilled in the art.

As discussed above, the present invention includes a single step, hydrothermal synthetic process whereby polycrystalline samples of any delafossite-like ($ABO_2$) material, can be synthesized with phase purity at low temperature and pressure. More particularly, $A_{1-m}A'_mB_{1-n}B'_nO_2$ solid solutions (where $0 \leq m \leq 1$ and $0 \leq n \leq 1$), including but is not limited to $CuAl_{1-n}Ga_nO_2$, previously unattainable by prior art methods, can now be synthesized. Although such delafossite compounds have long been known as have interesting luminescence properties and applications in catalysis and electrocatalysis, they have become the subject of much renewed interest with the recent discovery that $CuAlO_2$, for example, exhibits both p-type conductivity and transparency. It is in this transparent conducting oxide arena, in particular, where this invention may find its most useful and productive applications. For instance, such delafossites synthesized hydrothermally exhibit greater conductivities than high temperature ceramic products of the prior art.

As a point of contrast, traditional ceramic methods typically require high-energy input, in the form of increased temperature, and are diffusion limited, requiring several regrinding steps to increase homogeneity and prolonged reaction times. The present hydrothermal methods are especially desirable for preparing advanced materials because such obstacles can easily be overcome. The present synthetic methods typically involve temperatures no higher than about 210-215° C., pressures of approximately 5-10 atm, and reaction times that are at least one order of magnitude shorter than for analogous ceramic reactions. As mentioned above, the only other known prior art hydrothermal synthesis of delafossite materials requires temperatures greater than 500° C. and externally applied pressures of 3000 atm. Even under such extreme reaction conditions and unlike the present invention, phase purity could not be achieved for most products. Subsequent purification steps are required.

With regard to one aspect of this invention, the use of a neutral B-site metal as a reducing agent rather than as a direct exchange reactant has been shown to facilitate the dissolution of species otherwise difficult to dissolve, resulting in a significant increase product yield. With $CuBO_2$ compounds, for example, these redox active species readily oxidize in basic solution while simultaneously reducing the aqueous $Cu^{II}$ species to the desired $Cu^{I}$ species. This redox step is more easily accomplished for copper than is the dissolution of a $Cu^{I}$ species under aqueous conditions alone, as evidenced in the Pourbaix diagram. As such, the redox component of the overall reaction appears to facilitate phase purity.

EXAMPLES OF THE INVENTION

The following non-limiting examples and data illustrate various aspects and features relating to the compositions/materials and/or methods of the present invention, including the preparation of a variety of p-type transparent conducting oxides as are available through the synthetic methodology described herein. In comparison with the prior art, the present methods and compositions/materials provide results and data which are surprising, unexpected and contrary to the prior art. While the utility of this invention is illustrated through the use and characterization of several compositions/materials and their preparation, it will be understood by those skilled in the art that comparable results are obtainable with various other methods, compositions and/or materials, as are commensurate with the scope of this invention.

Example 1a

Instead of using thin-walled platinum tubes under the harsh conditions of Shannon et al, Teflon (fluoro(ethylene-propylene)) pouches were employed. The synthesis of this example and all related copper aluminate syntheses were made starting with commercially available aluminum metal and copper and aluminum oxides. Appropriate amounts of these species were placed along with ground NaOH pellets in each Teflon pouch. Mole fractions of the reactants were varied with x in accordance with the following reaction:

$$xCuO + \frac{1-x}{2} Cu_2O + \frac{x}{3} Al + \frac{3-x}{6} Al_2O_3 \xrightarrow{NaOH} CuAlO_2 \quad (3)$$

The total mass was constant and equal to 0.8 g. The pouches were sealed and placed into a 125 ml autoclave filled with deionized water. The autoclave was sealed and heated at 150° C. for 5 hrs and subsequently at 215° C. for 48 hrs, followed by slow cooling to room temperature at 0.1° C./min. Afterwards, each pouch contained both solid products and approximately 2.5 g of solution, owing to the permeability of the Teflon pouch and the basicity of the inside species. The Teflon pouches heated above 100° C. become permeable and an exchange reactions occurs between the inside powder and the outside solution. This reaction is very exothermic and appears to be responsible for the two-step heating process. The first step at about 150° C. seems to initialize the reaction, and the second at about 215° C. completes it.

Time and temperature were optimized, and the best results were obtained for the conditions described above. The filtered and dried solid products were analyzed by powder X-ray diffraction (XRD), scanning electron microscopy (SEM), differential thermal and thermogravimetric analyses (DTA and TGA), and the filtrate by inductively coupled plasma atomic emission spectroscopy (ICP).

Example 1b

More generally, delafossite-like materials were synthesized by placing 0.2 g NaOH(s)) along with stoichiometric amounts (see example 1) of AO, $A_2O$, B, and $B_2O_3$ in an FEP (fluoro(ethylene-propylene)) Teflon pouch. The pouch was sealed and placed in a 125-ml Teflon-lined autoclave (Parr) filled with 80-ml of deionized water. The total contents of each pouch were held constant to 0.8 g. The autoclave was sealed and first heated to about 150° C. for 5 hours to allow $H_2O$ to enter the permeable membrane of the pouch and dissolve the NaOH(s). This was followed by an approximate 210° C. step for 48 hours, with subsequent cooling to room temperature at 6° C./hr. Delafossite crystallites were recovered by filtration.

Example 1c

Delafossite phases prepared in accordance with this invention, using procedures analogous to that described in example 1b, include $CuAlO_2$, $CuGaO_2$, $CuFeO_2$, $CuLaO_2$ and $CuAl_{1-x}Ga_xO_2$ (solid solution); and $AgGaO_2$, $AgInO_2$ and $AgScO_2$.

Example 1d

Figure 7:
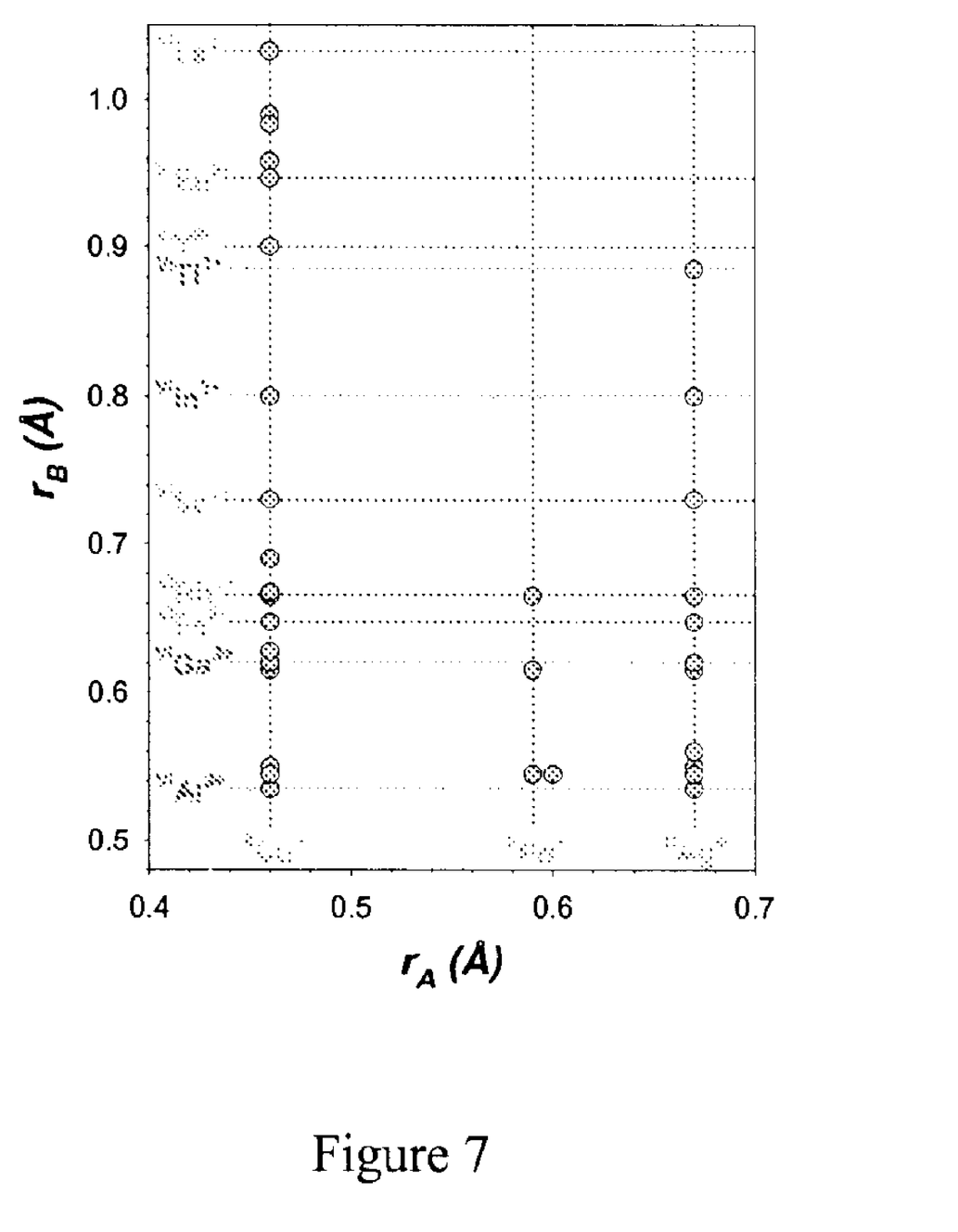
FIG. 7 is a plot of the known size of an A-site cation vs. the known size of a B-site cation in $ABO_2$ delafossites.

FIG. 7 plots the known size of an A-site cation (Cu, Pd, Pt, or Ag) vs. the known size of a B-site cation in $ABO_2$ delafossites. The bullets or points on FIG. 7 represent reported bulk delafossite phases in the literature. (For example, the point intersecting 0.80 Angstroms on the ordinate axis and 0.46 Angstroms on the abscissa corresponds to the compound $CuInO_2$.)

The phases/compositions synthesized above are representative of the many phases available using this invention. Owing to size effects which are well-known, accepted and understood in the art, and having made $CuAlO_2$ and $CuLaO_2$ delafossite structures, using this inventive methodology, any copper-containing delafossite compound that has a B-site cation ranging in ionic radius dimension between aluminum and lanthanum can also be made. This analogy can be applied in both the horizontal (to include Pt, Pd and Ag compositions) and vertical directions of the diagram in FIG. 7. It is also possible to synthesize previously unknown compounds and solid solutions.

Example 1e $AgBO_2$ compounds cannot be prepared using traditional high temperature solid-state techniques since $Ag_2O$ decomposes at temperatures above ~160° C. Palladium and platinum oxides also decompose at higher temperatures (~600° C.). Previously reported syntheses of these materials incorporated multi-step cation exchange reactions. The availability of such materials (e.g., $AgGaO_2$, $AgInO_2$ and $AgScO_2$ and corresponding representative Pd and Pt compositions) is a significant advance in the synthesis of delafossite-like materials. Preliminary data indicates that, similar to $CuAlO_2$, hydrothermally synthesized silver-containing delafossites have surprising and/or unexpected electrical conductivities compared to their high temperature or cation exchanged counterparts. Furthermore, as described elsewhere herein, a variety of $AgBO_2$ and $AgB_{1-n}B'_nO_2$ compositions heretofore unavailable or unknown in the art can be prepared and/or are contemplated in the context of this invention.

Example 2

With reference to the present methodology, optimal basic conditions appear to correspond to equimolar concentrations of NaOH and the A- or B-site species. It is important to note that these are only the initial conditions, since the basic conditions during the reaction are dynamic. As the quantity of water inside the pouches increases, and the species are solvated, the alkalinity of the solution decreases, ultimately leading to a slightly basic (pH≈8) solution at the end. Alkaline conditions aid to introduce the water into the vessel pouch, thereby transforming the initial oxides into hydroxides or oxy-hydroxides. A balance of reaction conditions promotes and maintains an optimal amount of incoming water and the solubility of these metal species. $Al_2O_3$ and $AlO(OH)$ are not problematic, because these species can be dissolved easily under either acidic or basic conditions. A factor in the formation of $CuAlO_2$ can be, however, the presence of any $Cu^I$ species in solution. Both the original and revised Pourbaix diagrams at standard pressure indicate that, regardless of temperature, a $Cu^I$ species can exist only in strongly acidic conditions. The hydrothermal formation of $CuAlO_2$ clearly contradicts this notion. Although achieved in more extreme regions of temperature and pressure, the previous results of Shannon, et al. further verify that at least one $Cu^I$ species can exist in an alkaline solution.

Example 3

Figure 1:
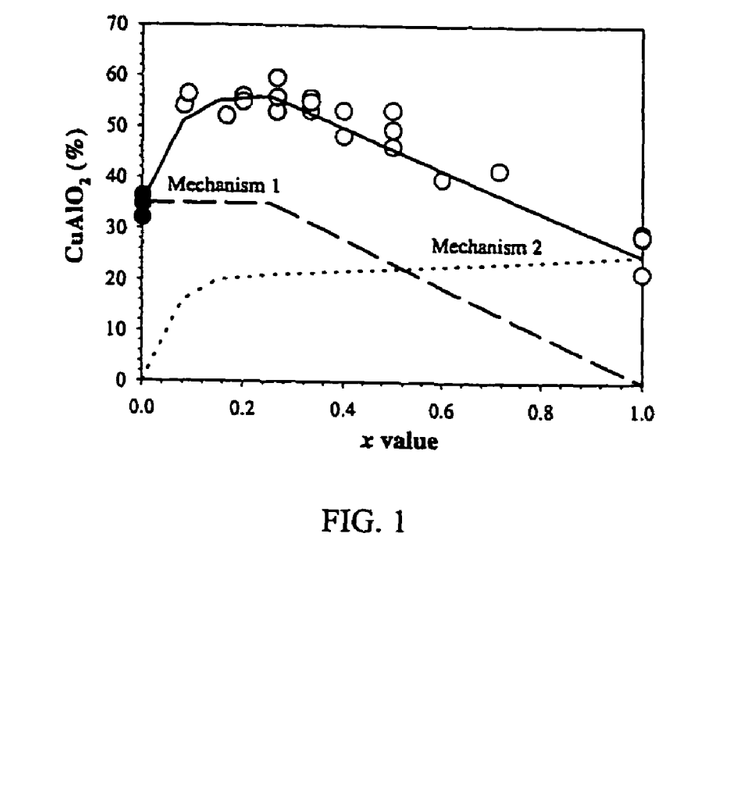
FIG. 1: Final percentage of $CuAlO_2$ obtained by direct comparison with PC-PDF standard and corroborated by the mass percentage calculated by Rietveld analysis.

Results obtainable through the present invention can be explained, without limitation, to this and several preceding and subsequent examples. According to reaction scheme (3) described above, many different syntheses were tried with a variation of x. For x=0.00, the reaction is simply a dissolution and subsequent reaction of the $Cu^I$ ($Cu_2O$ or $CuOH$) and $Al^{III}$ ($Al_2O_3$ or $AlO(OH)/Al(OH)_3$) species. For all other x values, the results can be explained with a redox reaction involving at least the $Cu^I/Cu^{II}$ and $Al^0/Al^{III}$ redox-couples. The stoichiometric coefficients in this reaction are calculated on the basis of the reduction of $Cu^{II}$ to $Cu^I$ compensated by the oxidation of $Al^0$ to $Al^{III}$. All of the stoichiometric reactions produce $CuAlO_2$ along with some un-reacted copper species. The final $CuAlO_2$ phase percentage obtained, as varies with x, is shown in FIG. 1. Starting at x=1.00, FIG. 1 shows that the formation of $CuAlO_2$ increases when x decreases for all x>0.30. The amount of $CuAlO_2$ obtained stabilized over the range from $0.00<x\leq0.30$. It is apparent from the observed decrease of $CuAlO_2$ for the x=0.00 composition that the complete absence of $Cu_2O$ precursor hinders the $CuAlO_2$ yield. On the other hand, using $Cu_2O$ as the only Cu precursor is even less efficient. The curve presented in FIG. 1 indicates that for the various syntheses under different conditions, the optimum results are observed in the $0.10\leq x\leq0.30$ composition range.

Example 4

Without limitation to any one theory or mode of reaction, the results of the previous examples can be explained using two different mechanisms. The first one corroborates the results obtained by Shannon et al., namely that, although difficult, $Cu_2O$ can be dissolved in a basic solution and can, along with $Al_2O_3$, produce 30-40% $CuAlO_2$. This is the case for the x=0.00 composition. The second mechanism corresponds to a redox reaction between $Cu^I/Cu^{II}$ and $Al^0/Al^{III}$, leading to various amounts of $CuAlO_2$ based on the composition. This mechanism is believed completely responsible for the x=1.00 composition. All of the intermediate compositions can be explained by a combination of these two mechanisms. For these cases, production of $CuAlO_2$ seemingly occurs by direct dissolution of $Cu^I$ and by reduction of $Cu^{II}$ into $Cu^I$ in solution. When x decreases from 1.00 to 0.00, the initial amount of $Cu_2O$ increases leading to an increased amount of $Cu^I$ species in solution, and thereby increasing the contribution of the first mechanism. A solubility limit is encountered at high initial $Cu_2O$ concentrations, since for all of the compositions with an initial x<0.30, the solution cannot accept any more $Cu^I$ species and therefore we witness a plateau. The other component of the final $CuAlO_2$ yield is a redox reaction, where, in solution, the Al metal is oxidized into $Al^{III}$ as the $Cu^{II}$ is reduced into $Cu^I$. As x is increased, the predominant form of the initial copper species is CuO. The results show that at lower concentrations of initial redox species, the higher the Cu yield into $CuAlO_2$, and as this amount increases, (i.e. as x increases), the yield decreases to a final value of only 30% for x=1.00. Taking all of this into account facilitates understanding the curve relating to the second mechanism in FIG. 1. This second mechanism appears to exact greater influence as x is increased, becoming the predominant mechanism for $x \geq 0.50$.

Example 5

In order to illustrate the possible effect of these mechanisms, non-stoichiometric reactions were tried, either with an excess of aluminum reagents or with a copper deficiency for the 0.10<x<0.30 compositions. The excess aluminum species do not affect the $CuAlO_2$ yield, confirming that they are not the limiting reagents in terms of solubility. On the other hand, when the initial amount of the copper species are decreased by half, phase pure $CuAlO_2$ was finally obtained. Using, for the purpose of this example, the results from the x=0.33 reaction this phenomenon can be elucidated: one-half of the initial copper species reacts to produce $CuAlO_2$, while the other half remains unchanged. Only by removing the unreacted half of the initial copper species can phase purity be obtained with 100% yield in the copper species. ICP analysis reveals that the remaining half of all aluminum species is still in solution.

Example 6

The process or mechanism by which $Cu^I$ species are generated is not completely understood, but several comments can be made. As evidenced, the synthetic methodology of this invention appears to be a complex combination of solubility factors and redox reactions. In addition to the $Cu^I/Cu^{II}$ and $Al/Al^{III}$ couples, the $H^+/H_2$ pair can also take part in the reaction by assisting first in the oxidation and hydrolysis of the aluminum metal into $Al(OH)_3$ and furthermore into $NaAlO_2$ with the sodium hydroxide, and second, in the reduction of $Cu^{II}$ into $Cu^I$. The mechanism of the direct dissolution of $Cu^I$, under these conditions, is not explained, and as we know, no other example is reported in the scientific literature. The second mechanism is not so surprising, and is comparable to the common test for glucose in urine which corresponds to the following reduction of $Cu^{II}$ into $Cu^I$:

Finally, without limitation, it should be noted that the disproportionation of $Cu^I$ into $Cu^{II}$ and $Cu^0$ was not observed in the reactions undertaken to demonstrate this invention.

Example 7

Figure 2:
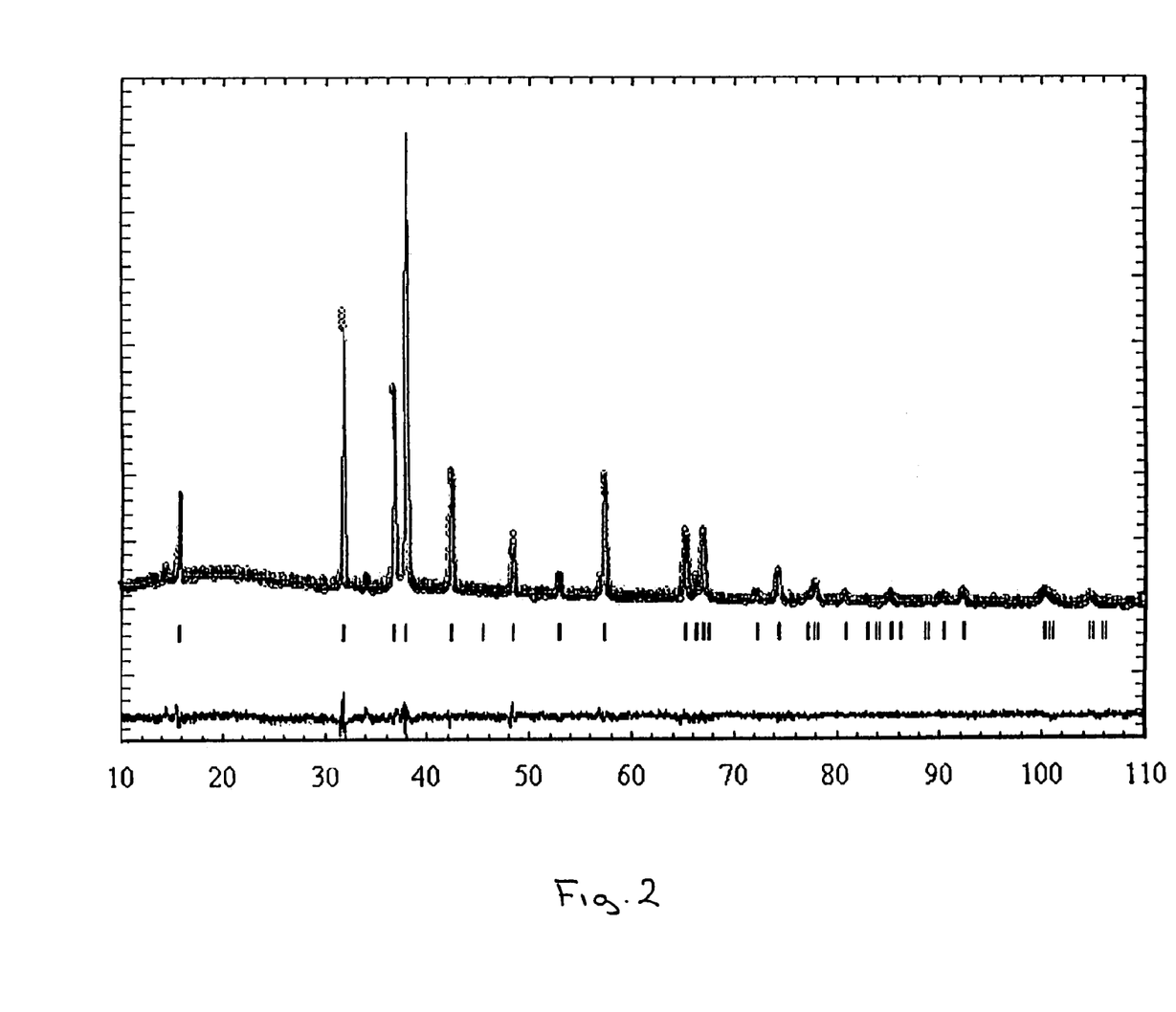

Hydrothermally obtained $CuAlO_2$ was refined by a Rietveld analysis [H. M. Rietveld, *Acta. Cryst.*, 22, 151-2 (1967). Line Profiles of Neutron Powder-Diffraction Peaks for Structure Refinement. H. M. Rietveld, *J. Appl. Cryst.*, 2, 65-71 (1969). A Profile Refinement Method for Nuclear and Magnetic Structures.] using the FullProf 98 program [J. Rodriquez-Carvajal, *Abstracts of the Satellite Meeting on Powder Diffraction of the XV Congress of the IUCr, Toulouse, France*. FULLPROF: A Program for Rieltveld Refinement and Pattern Matching Analysis.] (FIG. 2). The results of this refinement are given in Table 1. The parameters are in good agreement with a hexagonal cell of delafossite-type structure. The $R\bar{3}m$ space group has been confirmed. The c-axis oxygen position, which is the only refinable position, led to the expected Cu—O and Al—O distances, as shown, respectively. Overall the structural parameters are very consistent with all previous studies in bulk materials or single crystals.

TABLE 1

Crystallographic data of the refined $CuAlO_2$.

| Space group | | $R\bar{3}m$ (Hexagonal Axis) N° 166 |
|---|---|---|
| Lattice parameters | a | 2.861(1) Å |
| | c | 16.937(1) Å |
| Atomic positions | Cu | 0, 0, 0 |
| | Al | 0, 0, ½ |
| | O | 0, 0, 0.1089 (2) |
| Reliability factors | $R_B$ | 8.32% |
| | $R_{WP}$ | 16.32% |
| | $\gamma^2$ | 1.73% |
| Interatomic distances | Cu—O | 1.858(3) |
| | Al—O | 1.913(2) |

Example 8

The thermal stability of $CuAlO_2$ was found to be stable in air until at least 1200° C. DTA measurements do not present any notable thermal peaks during the warming and cooling scans. The oxidation of the cuprous ion with simultaneous formation of the Cu spinel phase according to:

$$4CuAlO_2 + \tfrac{1}{2}O_2 \rightarrow Cu_2O + 2CuAl_2O_4,$$

does not occur for T<1200° C. in contrast to high temperature ceramic products.

Example 9

Figure 3:
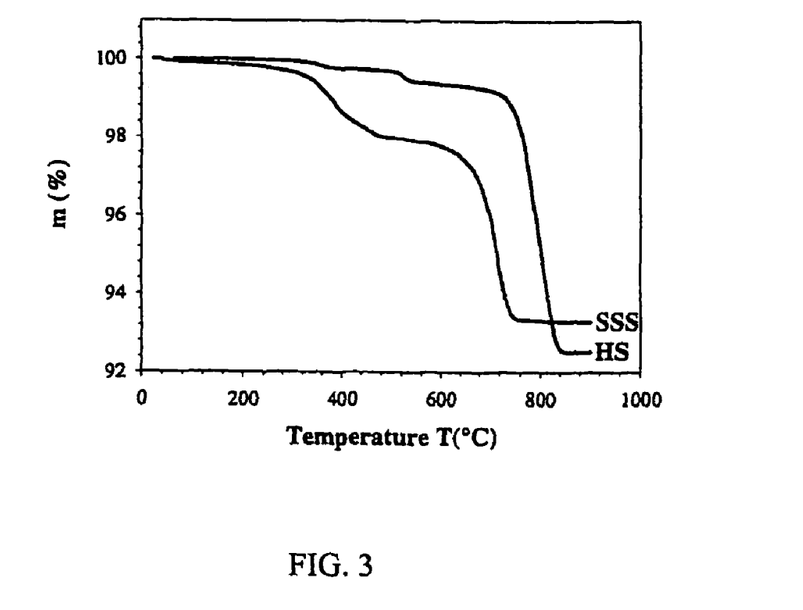
FIG. 3: TGA curves under reducing conditions ($H_2/N_2$) of $CuAlO_2$ samples. Solid State Synthesis sample (SSS) and Hydrothermal Synthesis sample (HS).

The optical properties of these representative compounds were measured. $CuAlO_2$ synthesized hydrothermally (HS sample) is a black powder without an absorption edge in the 250-700 nm range, contrary to the standard high temperature solid state synthesis of the prior art (SSS sample) whereas the powder is gray with a 1.65 eV indirect bandgap found by photo-electrochemical measurements. The visual difference in color between the two samples could be associated with differences in the oxygen content. Under reducing conditions (7% $H_2$ in $N_2$), the TGA curves, as seen in FIG. 3, were obtained for each sample, and the total oxygen content was calculated using the following reaction:

$$CuAlO_{2+\delta} + (\tfrac{1}{2}+\delta)H_2 \rightarrow \tfrac{1}{2}Al_2O_3 + Cu + (\tfrac{1}{2}+\delta)H_2O$$

Figure 4A:
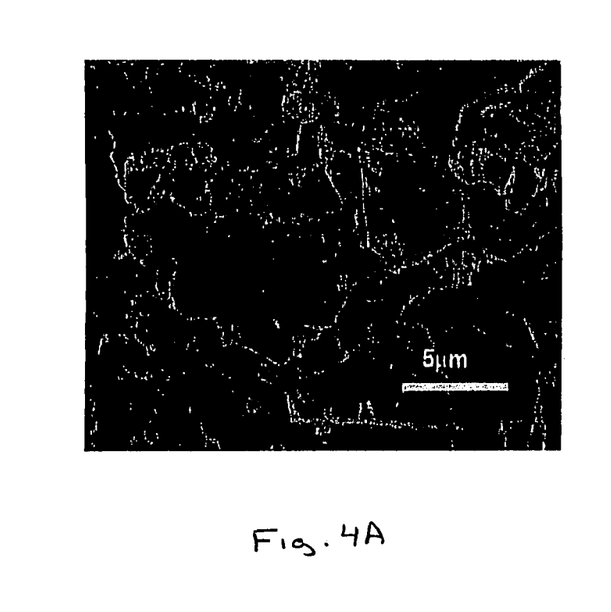
Figure 4B:
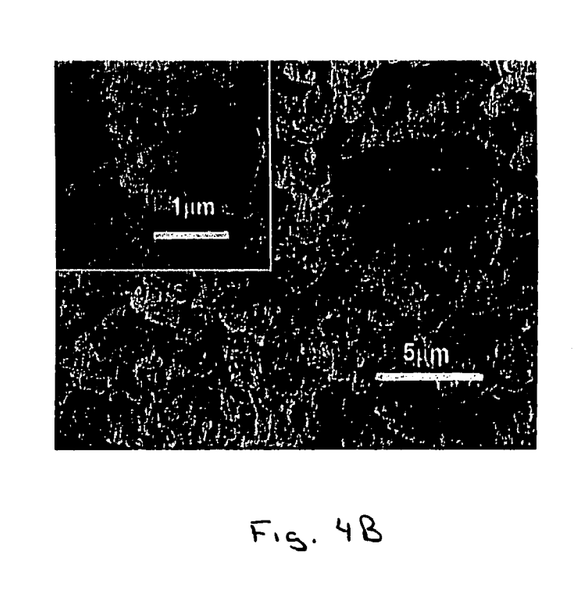

The CuAlO$_2$ HS sample has a larger total oxygen content ($\delta$=0.185) than that of the SSS ($\delta$=0.015). For instance, NiO has optical properties that are strongly dependant on the oxygen content and provides precedent for this phenomenon. Delafossite compounds are known to be oxygen acceptors that can form the super-oxide ABO$_{2+\delta}$ [R. J. Cava, W. F. Peck, J. J. Krajewski, S. W. Cheong and H. Y. Hwang, *J. Mater. Res.*, 9, 2, 314-317 (1994). Electrochemical and High Pressure Superoxygenation of YCuO$_{2+x}$ and LaCuO$_{2+x}$ Delafossites.], and this oxidation can occur through Chimie Douce [M. Trari, J. Topfer, J. P. Doumerc, M. Pouchard, A. Ammar and P. Hagenmuller, *J. Solid State Chem.*, 111, 104-110 (1994). Room Temperature Chemical Oxidation of Delafossite-type Oxide]. Furthermore, a change in the electronic structure can also be due to a slight doping with a p-type donor, such as Na in the Al sites. Neither circumstance appears operative here, as evidenced by the high thermal stability of CuAlO$_2$ up to 1200° C. and the absence of any endo or exo thermal peaks in the DTA plots, which can be attributed to Na disappearance. The disappearance of the absorption edge in the 200-750 nm spectrum, or the shifting of this absorption edge into a lower wavelength regime, may also be attributed to particle size effects arising out of the high-level, good crystallinity of the sample, as seen in the SEM images of FIG. 4.

A combined TGA and Riteveld analysis revealed a 7.5% replacement of monovalent Cu with trivalent Al and intercalation of oxygen equivalent to a hole carrier doping of p=0.22. Accordingly, the superior electrical conductivity and optical behaviors of the compounds/materials described herein can be attributed to oxygen intercalation and the high hole carrier densities available through the hydrothermal methods of the present invention. Comparable properties, surprising and unexpected over syntheses and compositions of the prior art, are realized with various other compositions available in accordance with this invention.

Example 10

Figure 5:
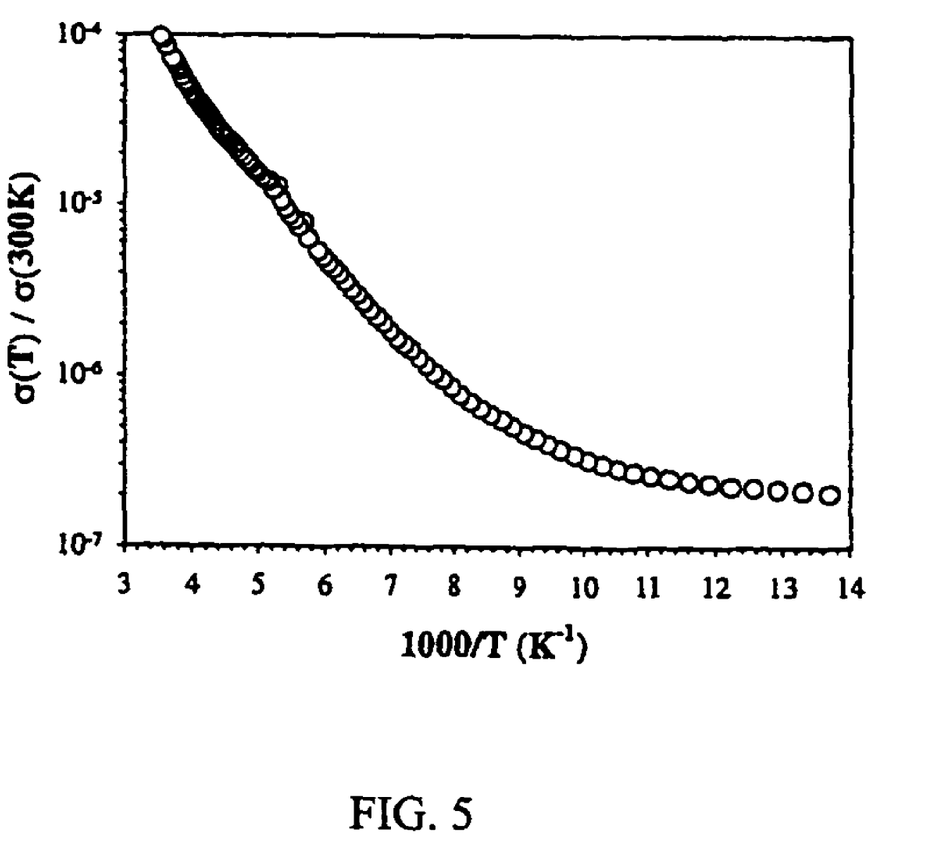
FIG. 5: Temperature dependence of normalized electrical conductivity for the HS $CuAlO_2$ sample.

The electrical properties of CuAlO$_2$ were also investigated as illustrative of one distinguishing aspect of this invention. Room temperature measurements, without corrections for specific density produced a conductivity $\sigma$=1.3×10$^{-3}$ S/cm. This value is at least as good as the $\sigma$=1.7×10$^{-3}$ S/cm reported by F. A. Benko and F. P. Koffyberg [F. A. Benko and F. P. Koffyberg, *J. Phys. Chem. Solids*, 45, 1, 57-59, (1984). Optoelectronic Properties of CuAlO$_2$.]. The semi-conductive temperature dependence is identical to the results of H. Kawazoe et al. [H. Kawazoe, M. Yasukawa, H. Hyodo, M. Kurita, H. Yanagi and H. Hosono, *Nature*, 389, 939-942 (1997). p-Type Electrical Conduction in Transparent Thin Films of CuAlO$_2$.] made on thin films, but with an estimated activation energy of 0.093 eV for the higher temperature region (see FIG. 5).

Example 11

As discussed above, the present invention provides a general reaction scheme and methodology for the facile, hydrothermal preparation of ABO$_2$ compounds, compositions and/or materials, including entire A$_{1-m}$A'$_m$B$_{1-n}$B'$_n$O$_2$ solid solutions (where 0$\leq$m$\leq$1 and 0$\leq$n$\leq$1). As a general synthetic procedure, each starting material is provided in an amount corresponding to its stoichiometric relationship with other reactants and/or materials. They are combined, with homogenous mixture and grinding if needed, then placed in a Teflon reaction bag. Other suitable reaction vessels can be utilized, as would be understood by those skilled in the art and made aware of this invention. Likewise, the reactants/starting materials of this reaction are limited only by way of the stoichiometric, valence and/or chemical relationships described herein. Commercially-available bag/pouch and bomb/autoclave equipment or straight-forward modifications thereof can be used to prepare the compounds of this invention in larger and/or industrial scale. Such scale-ups, with reproducible results, are available simply by adjusting the relative quantities of reactants/starting materials according to the stoichiometric relationships provided herein. A multitude of ABO$_2$ phases, whether or not having delafossite structures, can be prepared according to the broader aspects of this invention.

Figure 6A:
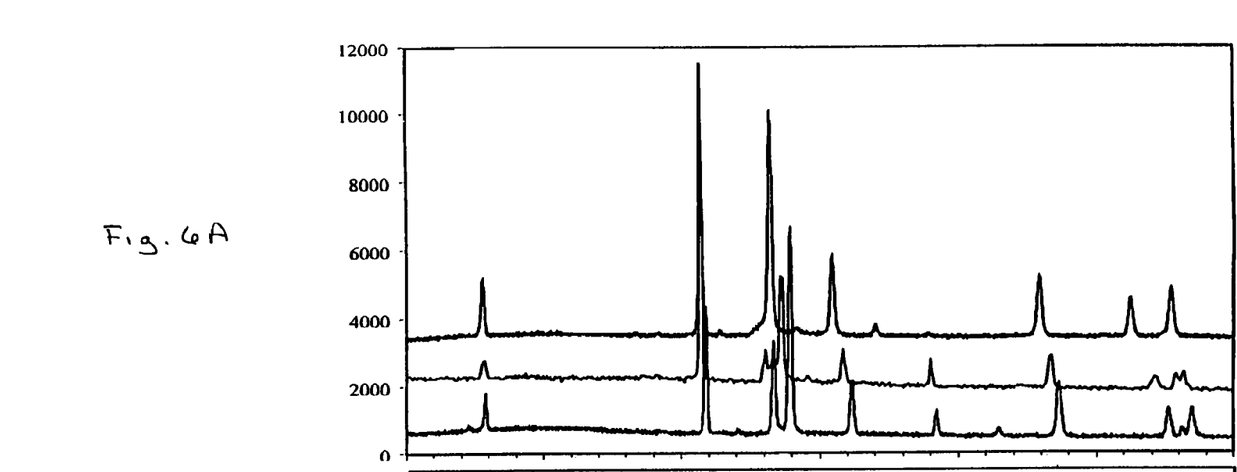
Figure 6B:
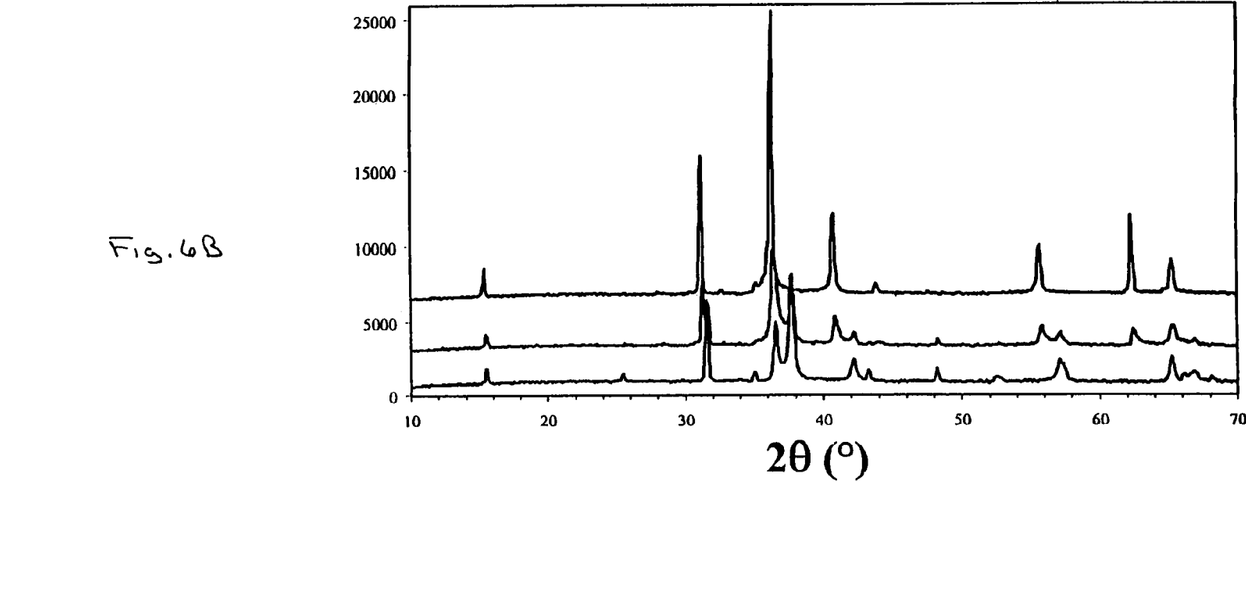

For instance, the general method of this example and as specified elsewhere herein (example 1), can be used to prepare a wide range of CuMO$_2$ (M=B=Al, Ga, Sc, In and Ln=lanthanides) compounds as well as the entire range of CuM$_{1-n}$M'$_n$O$_2$ solid solutions (where 0$\leq$n$\leq$1). In particular, the entire CuAl$_{1-n}$Ga$_n$O$_2$ solid solution (0$\leq$n$\leq$1), not otherwise available via high temperature solid state methods of the prior art, can now be prepared hydrothermally in a single reaction sequence under facile conditions. A number of such compositions have been prepared (n=0, 0.2, 0.4, 0.6, 0.8 and 1.0) to vary the relative stoichiometries of Al and Ga and resulting transparency and/or p-type conductivity. (See, also, FIGS. 6A and 6B.)

While the principles of this invention have been described in connection with specific embodiments, it should be understood clearly that these descriptions are provided only by way of example and are not intended to limit, in any way, the scope of this invention. For instance, while numerous materials/compositions have been described in conjunction with various valency relationships and resulting delafossite-type structures, various other structural modifications are possible and available for use as otherwise described herein as can be prepared through straight-forward adaptations of the present methods. Other advantages and features of this invention will become apparent in consideration of the claims filed hereafter, with the scope of those claims as determined by their reasonable equivalents, as would be understood by those skilled in the art and made aware of this invention.

The invention claimed is:

1. A phase pure polycrystalline solid solution with a delafossite structure of compositional formula Cu$_{1-m}$A'$_m$Al$_{1-n}$B'$_n$O$_2$ wherein A' is a monovalent metal cation selected from the group consisting of Pd, Pt, and Ag, and B' is a trivalent metal cation selected from the group consisting of Ga, Sc, In and a lanthanide series metal; 0<m<1; and 0<n<1.

2. A phase pure p-type transparent conducting oxide polycrystalline solid solution composition of formula Cu$_{1-m}$A'$_m$Al$_{1-n}$B'$_n$O$_2$, wherein A' is monovalent metal cation selected from the group consisting of Pd, Pt, and Ag, and B' is a trivalent metal cation selected from the group consisting of Ga, Sc, In and a lanthanide series metal; 0<m<1; and 0<n<1;
   with a delafossite crystalline structure produced by providing a basic reaction medium having CuO, CuO$_2$, Al and Al$_2$O$_3$;
   introducing water to said reaction medium at temperatures substantially less than about 500° C. and pressures substantially less than about 3000 atm; and
   isolating the phase pure p-type transparent conducting oxide composition of formula Cu$_{1-m}$A'$_m$Al$_{1-n}$B'$_n$O$_2$.

3. The composition of claim 2 wherein said medium temperature is increased during said reaction.

4. The composition of claim 3 wherein said medium temperature is about 150° C., then increased to about 215° C.

5. The composition of claim 2 wherein water is introduced to said reaction medium using a water-permeable vessel.

* * * * *